J. W. GARVIN & C. C. BOWEN.
Strainers and Alarms for Coffee and Tea Pots.

No. 196,443. Patented Oct. 23, 1877.

Witnesses.
Alfred A. Oatler
Alex H. Morgan

Inventors.
John W. Garvin
Charles C. Bowen
By Isaac R. Oakford
their Attorney

N. PETERS, PHOTO-LITHOGRAPHER, WASHINGTON, D. C.

UNITED STATES PATENT OFFICE.

JOHN W. GARVIN AND CHARLES C. BOWEN, OF PHILADELPHIA, PA.

IMPROVEMENT IN STRAINERS AND ALARMS FOR COFFEE AND TEA POTS.

Specification forming part of Letters Patent No. 196,443, dated October 23, 1877; application filed June 29, 1877.

*To all whom it may concern:*

Be it known that we, JOHN W. GARVIN and CHARLES C. BOWEN, of the city and county of Philadelphia, and State of Pennsylvania, have invented a new and useful Improvement in Strainer and Alarm for Tea and Coffee Pots, which is fully set forth in the following specification and accompanying drawings, in which—

Figure 1:
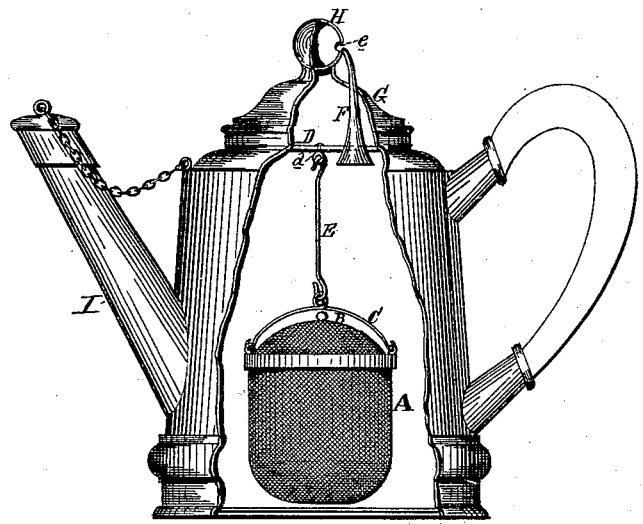
Figure 2:
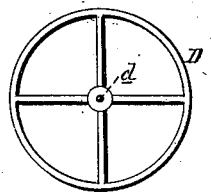

Figure 1 is a side elevation of a tea or coffee pot, with a portion of one side broken away to show our invention applied. Fig. 2 is a plan view of a ring with arms joined in the center, which fits into the mouth of the pot, for carrying a suspension-hook.

One part of our invention consists of a wire-gauze basket, in which the required quantity of tea or ground coffee is placed. This basket, containing the material from which the decoction is made, is suspended in the pot so as be completely immersed in the water contained therein. In this condition the full strength of the material is extracted without the particles separating and mingling with the water.

Our invention further consists of a whistle attached to the lid of the pot, to sound an alarm when the boiling or steam-generating point is reached.

The basket A, Fig. 1, is made of wire-gauze, the meshes of which are sufficiently fine to retain tea or ground coffee. The said basket is furnished with a cover, B, also of wire-gauze, and a bail, C, with a ring in the center to suspend it by.

D, Fig. 2, is a ring, with arms joined in the center to carry a smaller ring, d, and a hooked rod, E, at the lower end of which the basket A is suspended, as shown in Fig. 1.

The basket A is submerged in the water to within a short distance of the bottom of the pot, so that the material contained in it is thoroughly saturated with water and the full strength extracted in boiling. The basket also acts as a strainer in keeping the fluid free from particles of tea or coffee.

F, Fig. 1, is a trumpet-shaped tube, secured to the lid G, with the lower enlarged end projecting a short distance into the interior of the pot, and the upper end opening into a small aperture, e, in the side of a hollow sphere, H, which is attached to the lid, and acts as a whistle when steam is admitted through the tube F from the interior of the pot.

The object of the whistle H is to sound an alarm the moment the water commences to boil and generate steam, at which time it is advisable to remove the pot from the fire, in order to retain the full strength of the tea or coffee.

The mouth of the spout I is closed, to prevent the escape of steam, by a cap containing a piece of cork or other suitable substance to form a tight joint.

What we claim as new, and desire to secure by Letters Patent, is—

1. The combination, with a tea or coffee pot, of the wire-gauze suspension-basket A, cover B, bail C, hooked rod E, and ring D, substantially as and for the purpose set forth.

2. The combination, with a tea or coffee pot, of a whistle, H, and tube F, by which an alarm is sounded when the water reaches the boiling or steam-generating point, as set forth.

JOHN W. GARVIN.
CHARLES C. BOWEN.

Witnesses:
ISAAC R. OAKFORD,
ALEX. H. MORGAN.